United States Patent Office 3,224,210
Patented Dec. 21, 1965

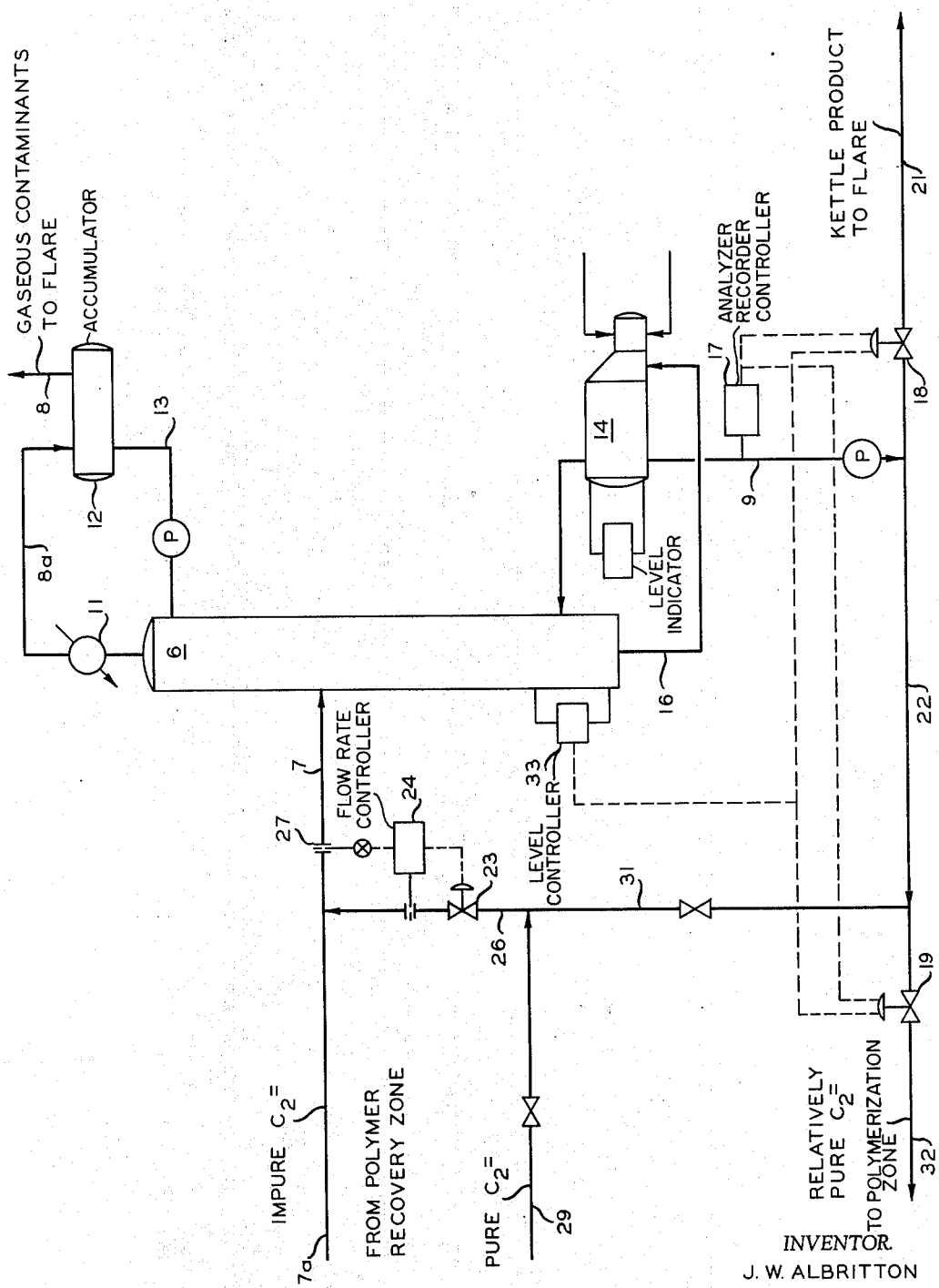

3,224,210
FRACTIONATION WITH CONSTANT FLOW
RATE FEED
James W. Albritton, Pasadena, Tex., assignor to Phillips
Petroleum Company, a corporation of Delaware
Filed Mar. 18, 1963, Ser. No. 265,692
11 Claims. (Cl. 62—21)

This invention relates to hydrocarbon purification. In one aspect the invention relates to a process for removing unwanted contaminants from a hydrocarbon stream by fractionation. In another aspect it relates to apparatus for purifying an impure olefin stream of variable flow rate to continuously produce olefin of required purity.

Frequently it is desirable to remove contaminants from a hydrocarbon stream. A very useful contaminant removal process comprises subjecting the hydrocarbon stream to a fractional distillation system for lighter contaminant separation overhead. For example, impure ethylene from a polymer recovery unit of a polyethylene plant is processed to restore its purity to a level comparable to that at which it entered the polymerization reaction train. Ethylene is passed through a fractionator to remove noncondensible gases, usually oxygen, nitrogen, and trace ethane, in the overhead vapor. A kettle product of relatively pure ethylene is withdrawn, and after drying, is suitable for return to the reaction train for polymerization.

In operating an impure ethylene purification column at a polyethylene plant it was found that the kettle product often contains more than 5 p.p.m. of oxygen, this level being unacceptable for polymerization. Thus, the ethylene had to be flared as much as 50 percent of the time. The rate of flow of impure ethylene into the fractionator necessarily varied. It was discovered that when the ethylene flow rate to the fractionator was below a predetermined rate that this coincided with the production of off specification ethylene in the kettle product.

It is, of course, desirable to accommodate variations in the ethylene feed while still maintaining the purity of the ethylene kettle product.

It is, therefore, an object of my invention, to treat an impure olefin stream for the removal of lighter contaminants therefrom.

Another object of the invention is to permit substantial variation in the impure olefin feed rate to a fractionator while maintaining the olefin kettle product within specification.

Still another object is to minimize the amount of impure olefin which is permanently lost from the polymerization process by flaring.

Other objects, aspects, and advantages of the invention will become apparent from a study of the accompanying specification, claims, and drawing.

In order to maintain an ethylene kettle product within specification, I have discovered the need for introducing a stream of ethylene into the impure olefin feed to a fractionator, as required. This ethylene is added to increase the total rate of flow of ethylene into the fractionator so that it is maintained above predetermined minimum flow rate and/or the contaminant concentration of the kettle product is within specification. Prior to the development of my invention the ethylene kettle product was flared as much as 50 percent of the time because it contained more than 5 p.p.m. of oxygen. Subsequent to the adoption of the method of this invention the olefin kettle product was within specification, in terms of oxygen concentration, about 98 percent of the time.

According to my invention, a process is provided for fractionating a mixture of fluids of varying boiling points to separate the constituents thereof, comprising: introducing a first stream comprising said mixture to the middle portion of a fractionation zone; withdrawing a second stream comprising substantially all of the lighter boiling constituents from the upper portion of said fractionation zone; withdrawing a third stream comprising substantially all of the higher boiling constituents from the lower portion of said fractionation zone; introducing a fourth stream of said mixture into said middle portion of said fractionation zone while the flow rate of said first stream is below a predetermined level; and ceasing the introduction of said mixture in to said fractionation zone when the flow rate of said mixture returns to said predetermined level and while it remains thereabove.

Further according to my invention there are provided hydrocarbon purification means comprising: a fractionation vessel having an inlet conduit for introducing an impure olefin into the middle portion thereof; an outlet conduit for overhead vapors; an outlet conduit for kettle product; a monitoring means operatively connected to said kettle product outlet adapted to determine the concentration of at least one contaminant therein; a flare conduit in communication with said kettle product conduit; a first motor valve disposed in said flare conduit and operatively connected to said monitoring means to alternately lock closed or unlock; a product conduit also in communication with said kettle product conduit; a recycle conduit communicating between said product conduit and said inlet conduit; a second motor valve disposed in said product conduit and also operatively connected to said monitoring means; an external source of olefin in communication with said recycle conduit to alternately lock closed or unlock; a flow rate measuring means operatively connected to said inlet conduit; a third motor valve disposed in said recycle conduit and responsive to said flow rate measuring means; and a liquid level controller means in communication with the bottom portion of said fractionation vessel, said first and second motor valves being responsive thereto.

In the drawing, a fractional distillation vessel 6 is provided with a feed source 7a, inlet 7, an overhead outlet conduit 8, and a bottom outlet conduit 9. The stream entering fractionator 6 from conduit 7a comprises an impure unreacted ethylene stream typically from the polymer recovery zone of a polyethylene plant. Fractionator 6 is suitably a 72 foot column, 16 inches in diameter, packed with Raschig rings, and conveniently operated at 350 p.s.i.g. Bottom temperature is about +5° F. and the top temperature is about −5° F.

Overhead stream 8a contains most of the non-condensibles in the olefin feed. Cooler 11 and accumulator 12 are provided in conduit 8a. Non-condensibles are withdrawn to flaring via conduit 8.

A reboiler 14 is provided in kettle product outlet conduit 16. Kettle product is withdrawn from reboiler 14 via conduit 9. An analyzer recorder controller 17 is operatively connected to kettle product conduit 9 for continuously monitoring p.p.m. of oxygen in said kettle product. The output signal of analyzer recorder controller 17 is used to lock and unlock motor valves 18 and 19 alternately. This analyzer can be a chromatographic analyzer and peak reader. Such analyzers are disclosed, for example, in U.S. Patent 3,018,310 and the references named therein. Motor valve 18 is located in flare conduit 21, and the motor valve 19 is located in recycle conduit 32.

A motor valve 23, regulated by flow rate controller 24, controls the rate flow through ethylene feed conduit 26. When transmitter 27 registers on flow rate controller 24 that the flow rate of impure ethylene in conduit 7 has fallen below a predetermined level, flow rate controller 24 opens motor valve 23 to permit additional ethylene to bring the total impure ethylene feed rate to above the predetermined minimum.

The ethylene stream 26 can come from one or both of two sources, either an external ethylene stream 29 which may be pure, or a portion of the kettle product ethylene stream 22 via conduit 31. When the kettle product is within specification most if not all of the kettle ethylene will be returned to the monomer preparation zone (not shown) via conduit 32. While the kettle product is off specification, it will pass either to flaring via conduit 21, or the impure ethylene feed via conduits 22, 31, and 26, or partially to each.

Liquid level controller 33 on column 6 is provided to regulate outflow of kettle product via conduits 21 or 32. Liquid level controller 33 seeks to throttle motor valves 18 and 19, and will only be able to actuate the one of these valves which analyzer recorder controller 17 has in the unlocked position.

EXAMPLE

Impure ethylene enters fractionator 6 via conduit 7 at a rate which fluctuates between 400 and 1000 lbs./hr., averaging 800 lbs./hr., containing 1–2 percent oxygen, 2–3 percent nitrogen, and traces of ethane. Contaminants are withdrawn overhead to flaring at a rate of 25 to 40 pounds/hr., and further comprises between 60 and 75 mole percent ethylene. The reflux rate through conduit 13 is about 2300 lbs./hr. Relatively pure ethylene is withdrawn from the fractionation unit 6 via conduit 9, and at the rate of about 575 to 960 lbs./hr.

While the ethylene kettle product is within specification, analyzer recorder controller 17 will maintain motor valve 18 locked, simultaneously holding motor valve 19 unlocked, permitting recycle of kettle ethylene to the monomer preparation system (not shown). Contrariwise, when the analyzer senses that ethylene in conduit 9 is off specification, analyber recorder controller 17 will unlock motor valve 18 to permit flaring off of nonspecification ethylene, and lock motor valve 19.

In the present system, it has been determined that when impure ethylene feed rate through conduit 7 falls below 500 lbs./hr., the ethylene kettle product will have an excess of 5 p.p.m. oxygen. For example, if stream 7a falls to 400 lbs./hr., then flow rate controller 24 actuates motor valve 23 to permit ethylene to enter from either or both of conduits 29 and 31 to return the total impure ethylene feed rate to at least 500 lbs./hr. Valve 23 will continue to control the flow thru conduit 26 until impure ethylene stream 7 exceeds 500 lbs./hr. When on specification product is again sensed by analyzer recorder controller 17, in its analysis of oxygen concentration, then flare conduit motor valve 18 will be shut down and all of the kettle product will be passed thru conduit 22.

Although the invention has been described in connection with purification of a particular olefin, it is equally applicable to other olefins, paraffins, aromatics, and the like. In fact, the apparatus and method of this invention may be used for fractionating any mixture of fluids of varying boiling points to separate the constituents.

It is conceded that for a given mixture of fluids to be fractionated, a given fractionation vessel, and a given purity of separation, that one skilled in this art can readily determine by calculation and/or testing the minimum rate of flow of feed required to achieve the preselected degree of separation.

Reasonable variation and modification are possible within the scope of the foregoing disclosure, the drawing and the appended claims to the invention.

I claim:

1. A process for fractionating a mixture of fluids of varying boiling points to separate the constituents thereof, comprising:
    (a) introducing a first stream comprising said mixture into the middle portion of a fractionation zone;
    (b) withdrawing a second stream comprising substantially all of the lower boiling constituents from the upper portion of said fractionation zone;
    (c) withdrawing a third stream comprising substantially all of the higher boiling constituents from the lower portion of said fractionation zone;
    (d) measuring the rate of introduction of said first stream into said fractionation zone;
    (e) introducing a fourth stream of at least one of the constituents of said mixture into said middle portion when the measured flow rate of said first stream is below a predetermined value; and
    (f) discontinuing the introduction of said fourth stream when the measured flow rate of said first stream is above said predetermined value.

2. The process of claim 1 wherein the fourth stream is a portion of said third stream.

3. A process for treating an impure ethylene stream to remove impurities therefrom which have boiling points lower than the boiling point of ethylene, comprising:
    (a) introducing such impure ethylene into the middle portion of a fractionation zone;
    (b) withdrawing a first stream comprising substantially all of the impurities from the upper portion of said fractionation zone;
    (c) withdrawing a second stream comprising substantially pure ethylene from the lower portion of said fractionation zone;
    (d) measuring the rate of introduction of said impure ethylene into said fractionation zone;
    (e) introducing a third stream comprising ethylene into the middle portion of said fractionation zone when the measured flow rate of said impure ethylene is below a predetermined value; and
    (f) discontinuing the introduction of said third stream when the measured flow rate of said impure ethylene is above said predetermined value.

4. Purification apparatus comprising:
    (a) a fractionation vessel;
    (b) first conduit means communicating with an intermediate region of said vessel to introduce a feed mixture;
    (c) second conduit means communicating with the upper region of said vessel to remove overhead vapors;
    (d) third conduit means communicating with the lower region of said vessel to remove a kettle product;
    (e) flow measuring means connected to said first conduit means;
    (f) fourth conduit means communicating with said first conduit means upstream of said flow measuring means to permit the introduction of additional fluid to said vessel;
    (g) valve means in said fourth conduit means; and
    (h) means responsive to said flow measuring means to regulate said valve means so as to control the flow through said fourth conduit means to maintain the flow into said vessel above a preselected minimum value.

5. The apparatus of claim 4 wherein said fourth conduit means is connected at its upstream end to said third conduit means to recycle a portion of kettle product to said vessel when said valve means is opened.

6. A process for treating an impure olefin stream to purify the same, comprising:
    (a) introducing said impure olefin to the middle portion of a fractionation zone;
    (b) withdrawing a first stream comprising substantially all of the contaminants from the upper portion of said fractionation zone;
    (c) withdrawing a second stream comprising substantially pure olefin from the lower portion of said fractionation zone;
    (d) continuously monitoring said second stream to determine the concentration of said contaminants therein;

(e) introducing a third stream of olefin into said middle portion of said fractionation zone while the concentration of contaminants in said second stream exceeds a preselected level; and (f) ceasing the introduction of said third stream into said fractionation zone when said contaminant concentration returns to said preselected level and while it remains therebelow.

7. A process for treating an impure olefin stream to purify the same, comprising:

(a) introducing said impure olefin to the middle portion of a fractionation zone;

(b) withdrawing a first stream comprising substantially all of the contaminants from the upper portion of said fractionation zone;

(c) withdrawing a second stream comprising substantially pure olefin from the lower portion of said fractionation zone;

(d) continuously monitoring said second stream to determine the concentration of said contaminants therein;

(e) introducing a portion of said second stream into said middle portion of said fractionation zone while the concentration of contaminants in said second stream exceeds a preselected level; and (f) ceasing the introduction of said third stream into said fractionation zone when said contaminant concentration returns to said preselected level and while it remains therebelow.

8. A process for treating an impure olefin stream to purify the same, comprising:

(a) introducing said impure olefin to the middle portion of a fractionation zone;

(b) withdrawing a first stream comprising substantially all of the contaminants from the upper portion of said fractionation zone;

(c) withdrawing a second stream comprising substantially pure olefin from the lower portion of said fractionation zone;

(d) continuously monitoring said second stream to determine the concentration of said contaminants therein;

(e) flaring said second stream so long as the concentration of contaminants exceeds a preselected level;

(f) introducing a third stream of olefin into said middle portion of said fractionation zone while the concentration of contaminants in said second stream exceeds a preselected level; and (g) ceasing the introduction of said relatively pure olefin into said fractionation zone when said contaminants concentration returns to said preselected level, and while it remains therebelow.

9. A process for treating an impure ethylene stream to purify the same, comprising:

(a) introducing said impure ethylene to the middle portion of a fractionation zone;

(b) withdrawing a first stream comprising substantially all of the contaminants further comprising oxygen from the upper portion of said fractionation zone;

(c) withdrawing a second stream comprising substantially pure ethylene from the lower portion of said fractionation zone;

(d) continuously monitoring said second stream to determine the concentration of said oxygen therein;

(e) introducing a third stream of ethylene into said middle portion of said fractionation zone while the concentration of oxygen in said second stream exceeds 5 p.p.m.; and (f) ceasing the introduction of said relatively pure ethylene into said fractionation zone when said oxygen concentration returns to said 5 p.p.m. and while it remains therebelow.

10. Purification means comprising:

(a) a fractionation vessel having an inlet conduit for introducing a feed mixture into the middle portion thereof;

(b) an outlet conduit for overhead vapors;

(c) an outlet conduit for kettle product;

(d) a monitoring means operatively connected to said kettle product outlet adapted to determine the concentration of at least one contaminant therein;

(e) a flare conduit in communication with said kettle product conduit;

(f) a first motor valve disposed in said flare conduit and operatively connected to said monitoring means to alternately lock closed or unlock;

(g) a product conduit also in communication with said kettle product conduit;

(h) a recycle conduit communicating between said product conduit and said inlet conduit;

(i) a second motor valve disposed in said product conduit and also operatively connected to said monitoring means to alternately lock closed or unlock;

(j) an external source of fluid in communicating with said recycle conduit;

(k) a flow rate measuring means operatively connected to said inlet conduit;

(l) a third motor valve disposed in said recycle conduit and responsive to said flow rate measuring means; and (m) a liquid level controller means in communication with the bottom portion of said fractionation vessel, said first and second motor valves being responsive thereto.

11. Fluid mixture separation means comprising:

(a) a fractionation vessel having an inlet conduit for introducing a feed mixture into the middle portion thereof;

(b) an outlet conduit for overhead vapors;

(c) an outlet conduit for kettle product;

(d) a flare conduit in communication with said kettle product conduit;

(e) a product conduit also in communication with said kettle product conduit;

(f) an external source of fluid in communication with said inlet conduit;

(g) a flow rate measuring means operatively connected to said inlet conduit;

(h) a first motor valve disposed in said external source and responsive to said flow rate measuring means;

(i) a liquid level controller means in communication with the bottom portion of said fractionation vessel;

(j) a second motor valve disposed in said flare conduit and operatively responsive to said liquid level controller; and (k) a third motor valve disposed in said product conduit and operatively responsive to said liquid level controller.

References Cited by the Examiner
UNITED STATES PATENTS

| | | | |
|---|---|---|---|
| 2,349,415 | 5/1944 | Draeger | 62—23 X |
| 2,882,693 | 4/1959 | Clay | 62—37 X |
| 2,885,863 | 5/1959 | Berger | 62—37 X |
| 2,933,900 | 4/1960 | Hanthorn | 62—21 |
| 2,973,628 | 3/1961 | Green | 62—37 X |
| 3,008,809 | 1/1961 | Martinez | 137—114 X |
| 3,009,864 | 11/1961 | Webb. | |

NORMAN YUDKOFF, *Primary Examiner.*